United States Patent [19]

Merrill et al.

[11] 4,130,599

[45] * Dec. 19, 1978

[54] SILANOL-FREE RESINS

[75] Inventors: Duane F. Merrill, Ballston Spa; Richard C. Cooke, Jr., Elnora, both of N.Y.

[73] Assignee: General Electric Company, Waterford, N.Y.

[*] Notice: The portion of the term of this patent subsequent to Sep. 18, 1990, has been disclaimed.

[21] Appl. No.: 696,663

[22] Filed: Jun. 16, 1976

Related U.S. Application Data

[63] Continuation of Ser. No. 578,983, May 19, 1975, abandoned, which is a continuation of Ser. No. 231,403, Mar. 2, 1972, abandoned.

[51] Int. Cl.$^2$ .............................................. C08L 43/04
[52] U.S. Cl. ............................. 260/825; 260/29.1 SB; 260/37 SB; 428/447; 528/10; 528/12; 528/32; 528/40; 528/42; 528/43
[58] Field of Search ............. 260/46.5 R, 825, 37 SB, 260/29.1 SB

[56] References Cited

U.S. PATENT DOCUMENTS

| | | | |
|---|---|---|---|
| 2,528,615 | 11/1950 | Smith | 260/46.5 R |
| 2,929,830 | 3/1960 | Kunowski | 260/448.2 R |
| 3,017,386 | 1/1962 | Brown, Jr. et al. | 260/46.5 R |
| 3,120,500 | 2/1964 | Huntington et al. | 260/46.5 R |
| 3,234,179 | 2/1966 | Katchman et al. | 260/46.5 R |
| 3,489,782 | 1/1970 | Pruvost et al. | 260/46.5 R |
| 3,634,297 | 11/1972 | Campbell | 260/46.5 R |
| 3,759,867 | 9/1973 | Merrill et al. | 260/825 |
| 3,919,344 | 11/1975 | Merrill et al. | 260/46.5 R |

*Primary Examiner*—Melvyn I. Marquis
*Attorney, Agent, or Firm*—E. Philip Koltos; John L. Young; Frank L. Neuhauser

[57] ABSTRACT

A silicone molding composition with improved thermal shock resistance having a plasticizing amount of a silicone resin comprising chemically combined $RSiO_{3/2}$ units and $R_2SiO$ units where the R to Si ratio may vary from 1.0 to 1.9 and the ratio of $RSiO_{3/2}$ units to $R_2SiO$ units may vary from 1:2.5 to 1:5.0 and containing less than 0.5 weight percent of silanol groups and preferably being substantially free of silanol groups where R is a monovalent hydrocarbon radical. There is also provided by the present invention a process for improving the thermal shock resistance of a silicone molding composition by having in said composition the aforesaid resin.

10 Claims, No Drawings

SILANOL-FREE RESINS

BACKGROUND OF THE INVENTION

The present application is a continuation application of patent application Ser. No. 578,983 filed on May 19, 1975 and now abandoned, which in turn is a continuation application of parent application Ser. No. 231,403 filed on Mar. 2, 1972 and now abandoned.

The present invenion relates to silicone resins and more particularly the present invention relates to silicone resins having less than 0.5 weight percent of silanol groups and preferably being substantially free of silanol groups.

Silicone resins have been found to be very useful in a variety of compositions and particularly paint and molding compositions. Such silicone resins that are incorporated into paint formulations and molding composition formulations to impart to the resulting cured or dried paint surface or molding compound surface, the inherent properties of silicones, that is, high temperature resistance, as well as weatherability and moisture resistance. However, it was found that, for instance, in silicone paints or silicone polyester paints that when such a paint was applied to such surface and thereafter dried, that the dried paint while being heat resistant and moisture resistant did not have as high a thermal shock resistance as would be desired.

A thermal shock resistance is the ability of a compound to resist cracking or crazing upon being taken from a very low temperature to a very high temperature in a small period of time. Thus, the thermal shock resistance of a compound can be measured by noting how many times the molded compound or paint can be heated from 0° C. to 200° C. in a period of 10 seconds or less or for that matter cooled from a temperature of 200° C. to the temperature of 0° C. in a period of 10 seconds or less before the compound cracks or crazes.

It is desirable that all types of silicone resin compositions whether they are used to form coatings or a particular formed part have the appropriate thermal shock resistance. This property of thermal shock resistance is particularly desirable when the compound or composition is a silicone paint since silicone paints are normally used to paint objects which are heated to high temperatures and which objects will in certain circumstances result in there being heated from a low temperature to a very high temperature in a short period of time, or in the reverse circumstance is being cooled from a high temperature to room temperature in a very short period of time. Thus, such silicone paints must have the appropriate thermal shock resistance, otherwise, when the cured paint is exposed to such rapid temperature changes it will crack.

In addition, as is well known, silicone molding compounds are often used to encapsulate diodes, triodes, resistors and other electronic components and particularly solid state electronic components. As is well known, these electronic components undergo rapid temperature changes within a very short period of time. As such, it is highly desirable that the silicone molding material that is used to encapsulate these electronic components not only have heat resistance, be an insulative type of material and have moisture resistance but also have thermal shock resistance. If the encapsulating material does not have sufficient thermal shock resistance then it is obvious the encapsulating material or molding compound will crack and result in the electronic component being exposed and uninsulated.

To improve the thermal shock resistance of such silicone compositions and particularly silicone compositions containing therein silicone resins as the base material, it was suggested that many different types of agents or plasticizing agents be added to the formulation containing the silicone resin. Some materials that were suggested were, for instance, dimethylpolysiloxane. Unfortunately, these various types of plasticizers and particularly the well known silicone oil plasticizers when incorporated into silicone paints and silicone molding compounds it was discovered that these well known plasticizers and particularly silicone plasticizers were not compatible with the basic resin that was used in formulating the paint or the molding compound. As a result, the plasticizing material that was used would separate out from the composition mixture and the resulting composition that was cured did not have the plasticizer incorporated into the cured silicone paint or molding compound composition. It was not until the present invention that a plasticizing compound was found that could be incorporated into silicone resin compositions and particularly silicone paint compositions and silicone molding resin compositions so as to plasticize these paint and molding compositions sufficiently so that they had superior thermal shock properties.

Accordingly, it is one object of the present invention to provide a silicone resin that is compatible with normal silicone resins and silicone materials to be found in slicone paints and silicone molding compositions.

It is another object of the present invention to provide a novel silicone resin that may be used as a plasticizer for silicone paints and silicone molding compositions so that such compositions will have superior thermal shock properties.

It is another object of the present invention to provide a novel silicone resin having a silanol content of less than 0.5 weight percent and preferably being substantially free of silanol groups.

It is an additional object of the present invention to provide a process for producing a novel silicone resin having less than 0.5 weight percent silanol groups and preferably being substantially free of silanol groups.

SUMMARY OF THE INVENTION

In accordance with the present invention there is provided a silicone resin useful as a plasticizer for silicone paints and silicone molding compounds said resin having chemically combined $RSiO_{3/2}$ units and $R_2SiO$ units where the R to Si ratio may vary from 1.0 to 1.9 and the ratio of $RSiO_{3/2}$ units to $R_2SiO$ units may vary from 1:2.5 to 1:5.0 and containing less than 0.5 weight percent of silanol groups, where the radical R is preferably selected from the group consisting of alkyl radicals, cycloalkyl radicals, alkenyl radicals, mononuclear aryl radicals, mononuclear aryl lower alkyl radicals, and halogenated derivatives of the foregoing radicals.

In the case where the silicone resin is to be used as a plasticizer for molding compounds, the R to Si ratio is preferably from 1.7 to 1.9 since such a silicone resin has the proper combination of plasticizing to rigidity properties, that is, it will impart the proper amount of plasticity to the cured molded compound.

In the case where the silicone resin is to be used as a plasticizer for silicone paints, it is preferred that the R to Si ratio vary from 1.0 to 1.5, since such a resin is more rigid that it is flexible and this type of silicone resin is desirable for silicone paints which in the cured state are on the rigid side and somewhat more rigid than the cured silicone resin molding compounds.

To impart the proper flexibility to the silicone resin, it is desirable that at least 30 percent and more preferably at least 40 percent of the R radicals in the two different types of units be mononuclear aryl radicals, mononuclear aryl lower alkyl radicals or halogenated derivatives of such radicals, for instance, phenyl. The presence of phenyl also imparts derived heat resistance to the final silicone resin. Although the silicone resin of the present invention may have less than 0.5 weight percent silanol groups and still be an efficient plasticizer in the more preferable embodiment, such silicone resin of the present case is substantially free of silanol groups.

Such a silicone resin is produced by hydrolyzing a mixture of silanes with water and then mixing the resulting hydrolyzate which is in the form of emulsion with a water-immiscible solvent such as xylene. The organic layer that forms is then extracted and the solids in the organic layer which is the resin intermediate of the present case is adjusted to 10 to 40 percent solids. Then there is added to such organic layer which is of 10 to 40 percent solids, 300 parts per million of an alkali metal hydroxide such as potassium hydroxide and the mixture is heated to the reflux of the solvent and maintained at the refluxing temperature for a period of anywhere from ½ to 10 hours or until it does not appear that any water is being given off. The refluxed mixture is then cooled and there is added to it an acid to neutralize the alkaline metal hydroxide and the resulting solution is adjusted to the desired level of solids for the particular use to which it is directed. If such a composition is desired to be used in molding compositions it is preferably adjusted to the level of 85 to 95% solids. On the other hand, if the desired resin composition of the present invention is to be used as a plasticizer for paints it may be adjusted at lower solids. Such a composition of the desired silicone resin in a solvent may be used as a plasticizer for any silicone resin composition but more particularly it is preferred to be used as a plasticizer for a silicone composition having therein as the base ingredient or material a silicone resin composed of $RSiO_{3/2}$ units and $R_2SiO$ units.

DESCRIPTION OF THE PREFERRED EMBODIMENT

The radicals R in the unit $RSiO_{3/2}$ unit and the unit $R_2SiO$ are all different and particularly the R radicals in the $RSiO_{3/2}$ units represent two or more different types of hydrocarbon substituent groups and this is also true of the R radicals in the $R_2SiO$ units of the resinous copolymer. The radical R may be selected from the class consisting of lower alkyl radicals of 1 to 8 carbon atoms, such as methyl, ethyl, propyl, butyl and octyl radicals; cycloalkyl radicals having 5 to 7 carbon atoms in the ring, e.g., cyclopentyl, cyclohexyl and cycloheptyl radicals; alkenyl radicals such as vinyl, allyl; mononuclear aryl radicals, e.g., phenyl, tolyl, xylyl radicals; mononuclear aryl lower alkyl radicals where the alkyl group has 1 to 6 carbon atoms, e.g., benzyl and phenylethyl radicals and halogenated derivatives of the above radicals such as, e.g., chloromethyl, betachloroethyl, chlorophenyl, dibromophenyl and trifluoromethyl, beta-chloroethyl, chlorophenyl, dibromophenyl and trifluoromethylethyl radicals. At least part of the R radicals in the $RSiO_{3/2}$ units and $R_2SiO$ units are preferably lower alkyl radicals having 1 to 8 carbon atoms, such as methyl, ethyl, propyl, etc.

The resin of the present invention may be made in which all the R radicals are lower alkyl radicals. However, it is found that a much more preferred resin is obtained if there is a certain amount of aromatic radicals in the $RSiO_{3/2}$ units and in the $R_2SiO$ units. Thus, preferably, at least 30 mole percent and more preferably at least 40 mole percent to 60 mole percent of the R radicals in the $RSiO_{3/2}$ units and $R_2SiO$ units are all selected from the class consisting of mononuclear aryl radicals, mononuclear aryl lower alkyl radicals and halogenated derivatives of the above radicals. The most preferable aromatic radical is phenyl.

In the most preferred embodiment or silicone resin of the present invention, it is preferred that 40 percent to 50 mole percent of the R radicals in the $RSiO_{3/2}$ units and the $R_2SiO$ units be phenyl radicals and that the rest of the R radicals be methyl. The presence of the phenyl or other types of aromatic radicals in the two units of the resinous copolymer of the present invention results in the resulting resin having enhanced heat resistance and in addition having more flexure strength. If the resinous material of the present case is incorporated into a system and particularly a resin system that is cured, the resulting resin system will be more flexible without breaking or crazing.

In the resinous copolymer of the present case which is composed of the two units specified above, the R to Si ratio may vary anywhere from 1.0:1 to 1.9:1. Thus, if the resulting resin of the present case is to be used as an additive or plasticizer for molding resin compounds then it is desired the R to Si ratio be from 1.5:1 up to 1.9:1. It is found with the R to Si ratio at this level, the resulting resinous copolymer has the proper combination of fluidity or plasticizing properties in combination with the rigidity or the normal resin-like properties. Thus, when such a resinous copolymer is incorporated into a molding compound while it will lend some rigidity to the final molding resin compound it will to a great extent because of the high R to Si ratio impart flexibility or plasticity so that it will plasticize and make more flexible the molding resin compound.

In the case where the silicone resin of the present case is to be added to paints or is to be used as a paint additive, it is desired that the silicone resin have less fluidity or plasticity and be more on the rigid side. As a result of this, it is preferred for such a use that the silicone resin have an R to Si ratio from 1:1 up to 1.5:1. Thus, it can be seen that the silicone resin of the present case can be varied in terms of the R to Si ratio so that the resin will be more suitable as an intermediate for a particular utility in a final composition. However, it is intended to broadly describe within the present invention a silicone resin where the R to Si ratio may vary from 1.0 to 1.9. It should be pointed out that the ratio of the $RSiO_{3/2}$ units to $R_2SiO$ units may also vary within strictly defined limits. Thus, the ratio of these units, that is, the ratio of the $RSiO_{3/2}$ units to the $R_2SiO$ units may vary from 1:2.5, respectively, up to 1:5.0, respectively. It should be pointed out that this figure is in direct corrolation with the R to Si ratio since the ratio of the R radicals to the Si atom will depend on the ratio of the $RSiO_{3/2}$ units to the $R_2SiO$ units. Thus, when the ratio of the $RSiO_{3/2}$ units to the $R_2SiO$ units varies from 1:2.5 up to 1:3.5, the resulting resinous copolymer while still being flexible and having the desired amount of plasticity, nevertheless is more on the rigid side or has more of the normal rigidity to be found with a silicone resin. As such, such a resin as pointed out is useful in applications where it is desired to have a plasticizer which still has high rigidity in the silicone paint. When the ratio of the $RSiO_{3/2}$ units to the $R_2SiO$ units varies from 1:3.5 up to 1:5.0, then such silicone resin has a high amount of plasticity and is extremely suitable for addition into silicone resin molding compounds as a plasticizing agent to improve the thermal shock resistance of such materials.

It should be pointed out that prior to the use of the silicone resins of the present case so as to prevent thermal shock cracking of molding compounds various conventional organic softener resins were used in an attempt to prevent thermal shock cracking without success. In addition, in particular molding compounds, the filler-to-resin ratio and the binder resin formulation was modified in various manners without any improvement in thermal shock resistance. Thus, the silicone resins of the present case were found to be the outstanding compounds or additives to be added to silicone molding compounds for the purpose of improving thermal shock resistance.

It should also be pointed out that the silicone resins of the compounds of the present case can be used as plasticizers for improving thermal shock resistance if the R to Si ratio is anywhere within 1:1 to 1.9:1, while the ratio of the $RSiO_{3/2}$ units to the $R_2SiO$ units may vary anywhere from 1:2.5 up to 1:5.0. It is just that the more preferred or narrow ranges indicated above are the ones that produce plasticizing silicone resins which are especially suited as additives.

A more important property of the silicone resins of the present case is their low silanol content. The silicone resin of the present case must have a silanol content, that is, at least below 0.5 weight percent. More preferably, the silanol content of the resinous copolymers of the present case is below 0.25 weight percent. The most preferred silicone resins of the present case are the ones which are substantially free of silanol groups or have only trace amounts of silanol groups on the resin. It has been found that the less silanol groups that the silicone resins of the present case contain the more plasticizing effect they have, such when they are added as intermediates to other silicone compounds, they result in the plasticizing of the silicone resin compound without subtracting from the normal strength properties of the final compound that is formed.

If the silanol content is above the levels indicated above, then the silicone resin of the present case will not result in any improvement in the thermal shock resistance properties of the final compound and in addition such a silicone resin will not act as a plasticizer for a silicone resin mixture that is used to form a final silicone resin composition. Thus, while a silicone resin of the present case having a silanol content above the values indicated above will not detract from the physical properties of the resulting silicone compound, it will not impart or result in the final silicone resin compound having the desired thermal shock resistance. Accordingly, as has been stated above in the most preferred embodiment of the present case, the silicone resin of the present case is substantially free of silanol groups, that is, the silanol content cannot be measured by any known measurement method such as a Zerewitinoff silanol determination.

The silicone resins of the present case may be used as plasticizers for a wide variety of silicone resin compounds and silicone resin compositions in addition to silicone based or silicone resin polyester based paints or silicone resin based molding compounds. More preferably, the silicone resins of the present case are used as plasticizers or additives to increase the flexibility of the final composition or the final product composition in the case where such a composition contains as a basic ingredient a silicone resin. Most preferably, the silicone resins of the present case are used as plasticizers and are compatible with silicone compositions having therein as a basic ingredient a silicone resin which silicone resin has $R'SiO_{3/2}$ units and $R_2'SiO$ units, where $R'$ is selected from the class consisting of monovalent hydrocarbon radicals and halogenated monovalent hydrocarbon radicals, and irrespective of the R to Si ratio, irrespective of the silanol content of such resins and irrespective of any other type of siloxane units that may be incorporated into the resin. It is, of course, obvious that the $R'$ radicals may be any type of normal monovalent hydrocarbon radicals or halogenated monovalent hydrocarbon radicals and need not be the same type of radicals as the R radicals in the silicone resin of the present case.

The silicone resins of the present case are prepared by a simple but exact process. Thus, the first step in the process is to take a mixture of silanes of the formula $R_aSiX_{4-a}$ and hydrolyze such silanes by adding them to water. In the above formula, R is the same as the $R'$ previously defined, X is selected from halogen such as chlorine and a varies from 1 to 2 depending on the desired final R to Si ratio in the final silicone resin product. As mentioned above, the above formula of the hydrolyzable silanes represents a mixture of silanes where in all cases X may be chlorine. However, the R group represents different types of radicals and preferably methyl and phenyl wherein in the mixture of chlorosilanes at least 40 percent of the R radicals are more preferably phenyl. In order to carry out the hydrolysis properly, it is necessary to have at least 2 parts of water per part of hydrolyzable silane blend. If there is less water than this, then there is obtained an acid hydrolysis, that is, there is obtained the production of a large amount of acid, which produces low molecular weight cyclics in the hydrolyzate. The presence of such low molecular weight cyclics in the final resin results in a diminution in the structural strength and tensile strength of the final resinous compound to which the silicone resin of the present case is added. An excess of water can be added such as, as much as 5 parts or more of water per part of chlorosilanes. In the hydrolysis, the hydrolyzable silanes are slowly added to the water so as to maintain the temperature of hydrolysis or the temperature of the water in the range of 25° C. to 85° C. It is undersirable to go above 85° C. since that will boil off the chlorosilanes that are added to the water. On the other hand, it is preferred not to go below 25° C. since this results in the formation of diphenyl diol in the silicone resin mixture which diphenyl diol is undesirable in the final resinous copolymer. Preferably, the temperature reaction is anywhere from 25° to 50° C.

Also, it is desired to pour the chlorosilanes into the water slowly so as to prevent gellation of the resulting water-resinous mixture. It is desirable during such addition of the hydrolyzable silanes to the water to have constant agitation so as to obtain complete hydrolysis or complete reaction of the hydrolyzable silanes in the water. At the end of the reaction period which takes anywhere from about ½ hour to 6 hours, there is obtained an emulsion of the resinous copolymer in water.

In order to extract the resinous copolymer from the water mixture, it is then desirable to add a water-immiscible organic solvent. There are two requirements for such a solvent, first of all, such a solvent must be inert to the resinous copolymer and second of all, the resinous copolymer must be completely and very easily soluble in the solvent. In addition, it is desirable that the solvent be non-toxic and safe to handle. As a result of these requirements, the most preferred water-immiscible solvents to be used in the present case are cyclohexane, heptane, octane, toluene and xylene, with toluene and xylene being the most preferred. Solvents such as alcohols or chlorohydrocarbon solvents are undesirable since they will react with the resinous copolymer. On the other hand, solvents such as benzene are quite toxic.

There is added to the resinous copolymer-water emulsion 1 part to 5 parts of solvent per part of the original hydrolyzable silanes added to the water. After the solvent is added, then the water emulsion and organic solvent are thoroughly mixed together for a period of time of ½ hour to 4 hours and then the two layers are allowed to separate. As a result of this mixing procedure, the resinous copolymer is extracted from the water into the organic solvent.

As an alternative to the above procedure, the water-immiscible solvent can be added to the water prior to the addition of the hydrolyzable silanes to the water, thus, eliminating a step in the process for producing the resin. As a result of this prior addition, agitation of the two layers together for an extended period of time is not necessary and further the addition of the solvent makes the control of the reaction temperature much easier at a faster rate of addition of the hydrolyzable silane.

After the organic layer is separated from the water layer then it may or may not be washed with water to extract out any excess acid from the organic layer until the solution is neutral. Such additional washing steps and extractions with water are not strictly necessary but may be used to remove small amounts of undesirable hydrochloric acid from the resinous copolymer organic solvent solution. After the washing steps have been terminated, then the solution is adjusted to a 10 to 40% solid solution. It is undesirable to have more than about 40% solids in solution since if the condensation or the next step in the process is carried out with the solids level much higher than 40% of the resulting solution gels. On the other hand, it is undesirable to go below 10% solids because of the large amounts of solvent that are necessary. Accordingly, it is most desirable to carry out the condensation reaction, the next step in the process at the 30 to 40% solids solution. To such a 30 to 40% solids solution of the resinous copolymer is one of the preferred water-immiscible solvents of the present invention, there is added 300 to 600 parts per million of alkali metal hydroxide as a catalyst based on the solids content of the solution. Examples of such alkali metal hydroxides are, of course, potassium hydroxide and sodium hydroxide.

Other strong bases may also be used as catalysts in the condensation. However, it is a necessity that the catalyst must be strong enough to carry out the desired condensation or separating out of silanol groups from their resinous copolymer. Examples of such strong bases are, of course, the alkali metal hydroxides that are mentioned above. At least 300 parts per million of the base is used to provide sufficient catalyst activity. More than 600 parts of an alkali metal hydroxide is not desired since a stronger concentration would attack and degrade the resinous copolymer. The resulting catalyzed solution is refluxed at the reflux temperature in a water-immiscible solvent, that is, 100° to 160° C. Such a refluxing of the resinous copolymer water-immiscible solvent solution is carried out until most if not all of the silanol groups have been cleaved from the resinous copolymer. Thus, the refluxing reaction is carried on for a period of 1 to 6 hours or until it is visually seen that no water is being given off, as a result of the condensation reaction. Alternatively, the resinous copolymer solution may be tested for silanol content until the silanol content of the resinous copolymer is less than 0.5 weight percent or preferably the resinous copolymer is substantially free of silanol groups.

After the condensation reaction is over and all of the silanol groups have been condensed out of the resinous copolymer, then the resulting solution is cooled and the alkali metal hydroxide or other strong base catalyst in the solution is neutralized with the proper amount of acid. Although, in such a neutralization procedure any acid can be used it is preferred to use acetic acid since such an acid because of its low boiling point can be stripped off with the excess water-immiscible organic solvent. Phosphoric acid, sulfuric acid, hydrochloric acid might be used for the neutralization procedure. However, if excess amounts of such acids are used, such acids will not be stripped off when the excess solvent is stripped off. The solution will then have to be back titrated so the final acid content of the resinous copolymer does not exceed or is less than 10 parts per million. An amount of acid in the resinous copolymer that is greater than 10 parts per million will not only over a period of time degrade the resinous copolymer but further it will result in degradation of the physical properties of any compound into which the silicone resin of the present case is incorporated. Thus, in the preferred embodiment of the present invention, it is desired to add acetic acid to the solution after the refluxing period and thus neutralize the alkali metal hydroxide. After the neutralization is over then heat can be applied to the resulting resinous copolymer solution, that is, the solution may be heated to above 100° C. so as to drive off the excess acetic acid and also drive off the excess solvent. Thus, the solution may be heated at a temperature above 100°, such as a temperature of 120° to 130° to drive off the excess acetic acid and excess solvent so as to obtain a solution of the resinous copolymer say, of 70 to 97% solids in the organic solvent. Such a solution is shelf stable and can be stored for any period of time before it is incorporated into a molding composition or into a silicone paint composition. Alternatively, all of the solvent may be stripped off so as to arrive at 100% solids of the resinous copolymer. Such a resinous copolymer is a fluid at room temperature and has a viscosity of about 500,000 centipoise. It has a glass transition temperature at 80° C., that is, its viscosity at 80° C. is 200 centipoise. Thus, irrespective of the solids content in which the final resinous copolymer is, it can be stored indefinitely before it is used and can be applied to the various uses which have been stated above. In addition, if it is formed as 100% solids product it can be redissolved at some future time in one of the solvents mentioned above such as, xylene or toluene and added as an intermediate for the particular purpose to which it may be directed to, such as, an additive in a molding composition.

It should be noted that the condensation procedure must be carried out within 24 hours after the resinous copolymer is formed, that is, the condensation procedure to remove the silanol groups. If the resinous copolymer is stored for more than 24 hours prior to removing the silanol groups, then you have the formation of stable cyclics in the resin which formation of stable cyclics lowers the molecular weight of the polymer and results in a degradation of the physical properties of the resulting silicone compound into which the silicone resin is incorporated into.

In the case of silicone paints, the silicone polyester resin is usually dissolved at a high solids content in a solvent such as xylene and toluene. There is then added to this solvent the resinous copolymer of the present case at a concentration of 10 to 30% by weight of the total resin content. The two resins are then agitated in the solution. Then the desired pigments are added to the solution and the resulting solution and pigments therein are ground up in a ball mill so as to disperse the pigment in the solution. The paint is then ready for use which paint will have the desirable properties of silicone resins, that is, high heat resistance and weatherability resistance, including moisture resistance, with the additional property of flexure strength, that is, the cured paint has toughness that can withstand bending without breaking and it also has thermal shock resistance, that is, it can withstand large variations of temperature over short periods of time without cracking or crazing.

The resinous copolymer of the present case can also be used as a process aid in the preparation of heat vulcanizable silicone rubber compositions. Heat curable silicone rubber composition comprises a polydiorganosiloxane gum which may be represented by the formula $R''_n SiO_{(4-n)/2}$ where $R''$ is selected from the group consisting of monovalent hydrocarbon radicals, halogenated monovalent hydrocarbon radicals and cyanoalkyl radicals and n varies from 1.97 to 2.1. Such a polydiorganosiloxane gum which is preferably a polydimethylsiloxane gum may have a viscosity of 500,000 to 10,000,000 centipose at 25° C. In preparing heat vulcanizable silicone rubber compositions the gum is prepared and there is mixed into it a filler and preferably a silica filler which may be precipitated silica or fumed silica. The resulting mixture may then be cured in the presence of a peroxide catalyst such as benzyl peroxide and dicumyl peroxide at elevated temperatures, that is, temperatures above 100° C., for a period of 10 minutes to 1 hour to form a silicone elastomeric composition.

As is well known, it is quite difficult to incorporate the silica filler into the gum since the filler tends to ball up and it is only incorporated or uniformly dispersed into the gum with difficulty. One of the reasons for this is the high viscosity of the gum and the powdery nature of the filler. As a result, it has become common to use various types of silicone agents which are known as process aids which are added to the gum so as to facilitate the incorporation of the filler into the gum. An example of such a process aid is to be found in Fekete, U.S. Pat. No. 2,954,357.

Among the many uses of the resinous copolymer of the present case, it has also been discovered that it may be used as a process aid in the incorporation of filler in polydiorganosiloxane gum. Thus, when such incorporation of the filler into the gum takes place at a temperature above 80° C., the resinous copolymer of the present case which at that temperature assumes a low viscosity has been found suitable as a process aid to facilitate the incorporation of silica filler into a polydiorganosiloxane gum.

The following examples are meant to illustrate the novel silicone resin and the novel process for forming such a silicone resin of the present invention and are not intended in any way to limit or define the limits of the scope of the present invention. All parts are by weight.

EXAMPLE 1

There is added to 3000 parts of water a silane blend consisting of 88 parts of methyltrichlorosilane, 229 parts of phenyltrichlorosilane, 279 parts of dimethyldichlorosilane and 411 parts of diphenyldichlorosilane. The rate of addition is controlled for 20 minutes, maintaining the peak reaction temperature below 85° C. The mixture is stirred for 10 minutes, then 400 parts of toluene is added and stirred for 10 minutes. The mixture is allowed to settle and the organic layer is recovered by separating and drawing off the (bottom) acid water layer. The resin solids are adjusted to 40% in toluene. Then 300 parts per million of potassium hydroxide based on resin solids are added from a 10% water solution of the hydroxide to the resin solution. The mixture is heated to reflux for 1 hour and the condensate is continually trapped off. The potassium hydroxide is neutralized with an excess of acetic acid and then the solvent and excess acetic acid are stripped off at a batch temperature of 120°–130° C. and 70–80% solids. There is prepared a resinous copolymer of $CH_3SiO_{3/2}$ units, $C_6H_5SiO_{3/2}$ units, $(CH_3)_2SiO_2$ units and $(C_6H_5)_2SiO_2$ units where the $CH_3$, $C_6H_5$ to Si ratio is 1.7:1 and the silanol content as determined by Zerewitinoff analysis is 0.2 weight percent.

EXAMPLE 2

There is added to a mixture consisting of 3000 parts of water and 900 parts of acetone a silane blend consisting of 208 parts of methyltrichlorosilane, 294 parts of phenyltrichlorosilane, 216 parts of dimethyldichlorosilane, 282 parts of diphenyldichlorosilane and 900 parts of toluene. The rate of addition is controlled for 35–40 minutes maintaining the reaction temperature below 40° C. The mixture is agitated for 30 minutes, allowed to settle 10 minutes and then the acid waer (bottom) layer is drawn off and the organic layer is recovered. The residual acid is removed by washing the solution with fresh water. The resin solids were adjusted to 40% in toluene. Then 300 parts per million of potassium hydroxide based on resin solids are added from a 10% water solution of the hydroxide. The mixture is heated to reflux and refluxed for 1 hour at 100°–110° C. continually trapping off the condensate. The hydroxide is neutralized with an excess of acetic acid and then the toluene and excess acetic acid are stripped off to a resin solids of 70–80%. There is prepared a resinous copolymer of $(CH_3)SiO_{3/2}$ units, $C_6H_5SiO_{3/2}$ units, $(CH_3)_2SiO_2$ units, and $(C_6H_5)_2SiO_2$ units where the $CH_3$, $C_6H_5$ to Si ratio if 1.5:1 and the silanol content is 0.4%.

EXAMPLE 3

A silane blend consisting of 620 parts of phenyltrichlorosilane, 380 parts of dimethyldichlorosilane is mixed with 900 parts of toluene and is added to 4000 parts of water. The rate of addition is controlled for 20–30 minutes maintaining the reaction temperature between 20°–40° C. The mixture is agitated for 30 minutes, allowed to settle 30 minutes and then the acid water (bottom) layer is drawn off and the organic layer is recovered. The residual acid is removed by washing the solution with fresh water. The resin solids are adjusted to 30% in toluene. Then 300 parts per million of potassium hydroxide based on resin solids is added from a 10% water solution of the hydroxide. The mixture is heated to reflux and refluxed for 1 hour at 100°–110° C. continually trapping off the condensate. The hydroxide is neutralized with an excess of acetic acid and then the toluene and excess acetic acid were stripped off to a resin solids of 70–80%. There is prepared a resinous copolymer of $C_6H_5SiO_{3/2}$ units and $(CH_3)_2SiO_2$ units where the $CH_3$, $C_6H_5$ to Si ratio if 1.5:1 and the silanol content is 0.1%.

EXAMPLE 4

A silane blend consisting of 485 parts of phenyltrichlorosilane, 370 parts of dimethyldichlorosilane and 145 parts of diphenyldichlorosilane is mixed with 900 parts of toluene and is added to 4000 parts of water. The rate of addition is controlled for 20–30 minutes maintaining the reaction temperature between 30°–60° C. The mixture is agitated for 30 minutes, allowed to settle 15 minutes and then the acid water (bottom) layer is drawn off and the organic layer is recovered. The residual acid is removed by washing the solution with fresh water. The resin solids are adjusted to 30% in toluene. Then 300 parts per million of potassium hydroxide based on resin solids is added from a 10% water solution of the hydroxide. The mixture is heated to reflux and refluxed for one hour at 100°–110° C. continually trapping off the condensate. The hydroxide is neutralized with an excess of acetic acid and then the toluene and excess acetic acid are stripped off to a resin solids of 70–80%. There is prepared a resinous copolymer of $C_6H_5SiO_{3/2}$ units, $(CH_3)_2SiO_2$ units, and $(C_6H_5)_2SiO_2$ units where the $CH_3$, $C_6H_5$ to Si ratio is 1.6:1 and the silanol content is substantially 0% by weight.

We claim:

1. A silicone molding composition with improved thermal shock resistance having therein a base silicone resin having $R^1SiO_{3/2}$ unit and $R_2^1SiO$ units where $R^1$ is selected from the class consisting of monovalent hydrocarbon radicals and halogenated monovalent hydrocarbon radicals, a filler and comprising the improvement in which there is present a plasticizing amount of a low-silanol content silicone resin having less than 0.5 weight silanol groups and an R to Si ratio that varies from 1.0:1 to 1.9:1 that is produced by the process comprising (a) adding a mixture of hydrolyzable silanes of the formula,

$R_aSiX_{4-a}$ to water where there is present at least 2 parts of water per part of said silanes and 1 to 5 parts of a water-immiscible organic solvent per part of said silanes at a temperature range of 25° C. to 85° C. and where the silanes are added to said water slowly so as to form a hydrolyzate; (b) continually agitating said mixture; (c) separating the organic layer and adjusting it to 10–40% solids; (d) within 24 hours from the formation of said hydrolyzate catalyzing said organic layer with 300–600 ppm of an alkali metal hydroxide per part of solid, and refluxing the resulting mixture at 100°–160° C.; (e) neutralizing the alkali metal hydroxide in the refluxed mixture with acetic acid; and (f) stripping from the organic layer excess acetic acid and solvent, where R is selected from the group consisting of alkyl radicals of 1 to 8 carbon atoms, cycloalkyl radicals of 5 to 7 carbon atoms, alkenyl radicals of 2 to 8 carbon atoms, mononuclear aryl radicals, mononuclear aryl lower alkyl radicals where the alkyl portion is 1 to 6 carbon atoms and halogenated derivatives of the above radicals, where X is a chlorine radical and a is a whole number that varies from 1 to 2 and such that 40 mole percent to 60 mole percent of the R radicals are selected from the class consisting of mononuclear aryl radicals and mononuclear aryl lower radicals and halogenated derivatives of the foregoing radicals.

2. The composition of claim 1 wherein the water-immiscible organic solvent is selected from the group consisting of toluene, xylene, heptane, octance and cyclohexane.

3. The composition of claim 1 wherein the alkali metal hydroxide is potassium hydroxide.

4. The composition of claim 1 where R is selected from methyl and phenyl.

5. The composition of claim 1 wherein the low-silanol content resin is substantially silanol-free and has an R to Si ratio of 1.5:1 to 1.9:1.

6. A process for improving the thermal shock resistance of a silicone resin molding composition comprising adding to a base silicone resin having $R^1SiO_{3/2}$ unit and $R_2^1SiO$ unit wherein $R^1$ is selected from the class consisting of monovalent hydrocarbon radicals and halogenated monovalent hydrocarbon radicals and a filler and a plasticizing amount of a low-silanol content silicone resin produced by the process comprising (a) adding a mixture of hydrolyzable silanes of the formula,

$R_aSiX_{4-a}$ to water where there is present at least 2 parts of water per part of said silanes and 1 to 5 parts of a water-immiscible organic solvent per part of said silanes at a temperature in the range of 25° C. to 85° C. and where the silanes are added to said water slowly so as to form a hydrolyzate; (b) continually agitating said mixture; (c) separating the organic layer and adjusting it to 10–40% solids; (d) within 24 hours from the formation of said hydrolyzate catalyzing said organic layer with 300–600 ppm of an alkali metal hydroxide per part of solid, and refluxing the resulting mixture at 100°–160° C.; (e) neutralizing the alkali metal hydroxide in the refluxed mixture with acetic acid; and (f) stripping from the organic layer excess acetic acid and solvent, where R is selected from the group consisting of alkyl radicals of 1 to 8 carbon atoms, cycloalkyl radicals of 5 to 7 carbon atoms, alkenyl radicals of 2 to 8 carbon atoms, mononuclear aryl radicals, mononuclear aryl lower alkyl radicals where the alkyl portion is 1 to 6 carbon atoms and halogenated derivatives of the above radicals, where X is a chlorine radical and a is a whole number that varies from 1 to 2 and such that 40 mole percent to 60 mole percent of the R radicals are selected from the class consisting of mononuclear aryl radicals and mononuclear aryl lower alkyl radicals and halogenated derivatives of the foregoing radicals.

7. The process of claim 6 wherein the water-immiscible organic solvent is selected from the group consisting of toluene, xylene, heptane, octane and cyclohexane.

8. The process of claim 6 wherein the alkali metal hydroxide is potassium hydroxide.

9. The process of claim 6 where R is selected from methyl and phenyl.

10. The process of claim 6 wherein the low silanol content resin is substantially silanol-free and has an R to Si ratio of 1.5:1 to 1.9:1.

* * * * *